United States Patent [19]

Myers et al.

[11] Patent Number: 4,583,402
[45] Date of Patent: Apr. 22, 1986

[54] FLUID-GAUGING SYSTEMS

[75] Inventors: Ronald V. Myers; Peter R. Thrift, both of Basingstoke, England

[73] Assignee: Smiths Industries Public Limited Company, London, England

[21] Appl. No.: 591,366

[22] Filed: Mar. 20, 1984

Related U.S. Application Data

[63] Continuation-in-part of Ser. No. 294,950, Aug. 21, 1981, abandoned.

[30] Foreign Application Priority Data

Aug. 23, 1980 [GB] United Kingdom ............... 8027500

[51] Int. Cl.$^4$ ............................................. G08B 21/00
[52] U.S. Cl. ................... 73/304 C; 73/304 R
[58] Field of Search ............... 73/304 C, 304 R; 331/109; 340/620, 618; 329/103, 50; 361/284; 324/61 R; 328/166; 363/160, 159

[56] References Cited

U.S. PATENT DOCUMENTS

| | | | |
|---|---|---|---|
| 3,267,378 | 8/1966 | Barter | 329/103 |
| 3,883,755 | 5/1975 | Faulkner | 329/103 |
| 4,110,740 | 8/1978 | Akita et al. | 73/304 R |
| 4,259,865 | 4/1981 | Myers | 73/304 C |

Primary Examiner—Charles Frankfort
Assistant Examiner—David R. Schuster
Attorney, Agent, or Firm—Pollock, Vande Sande & Priddy

[57] ABSTRACT

The output of a capacitance fuel sensor is supplied to two switches that are controlled by a switching control unit. The two switches are opened and closed in synchronism and antiphase with one another, and in quadrature with the drive voltage applied to the sensor. The output of one switch is supplied to the input of a first integrating current-to-voltage amplifier which in turn supplies a signal representative of fuel quantity to a fuel indicator. The output of the other switch is supplied to another integrating current-to-voltage amplifier which in turn supplies a signal representative of the quantity of contaminants to a contaminant indicator.

11 Claims, 3 Drawing Figures

FLUID-GAUGING SYSTEMS

CROSS-REFERENCE TO RELATED APPLICATION

This application is a continuation-in-part of U.S. patent application Ser. No. 294,950 filed Aug. 21, 1981, now abandoned.

BACKGROUND OF THE INVENTION

This invention relates to fluid-gauging systems.

The invention is particularly concerned with gauging systems for providing an indication of the quantity of fuel in a fuel tank and, more particularly, a fuel tank in an aircraft.

In previous fluid-gauging systems, the level of fluid in a container is determined by detecting changes in the value of a capacitance sensor located within the container. The sensor generally has two plate electrodes, separated by an air-gap which is filled or emptied as the level of fluid changes, thereby altering its capacitance. An alternating electric signal is supplied to the sensor, and its output is supplied to a suitable measuring or detecting circuit.

Difficulties have been experienced in the past with such systems for various reasons. In some previous arrangements it has been necessary to use electrically-screened cables to supply the energizing signal to the sensor capacitor and to supply the output signal from the capacitor to the measuring or detecting circuit. Without such screened cables there is a risk that there will be electrical interference with these signals from other electrical equipment in the vicinity. Screened cables, however, have the disadvantage of being substantially heavier and more expensive than unscreened cables; this advantage is especially important in aircraft applications and even more so where a large number of sensing capacitors are used each of which may be provided with an individual cable. Connectors used with screened cables must also themselves be screened and this leads to a further increase in complexity, cost and weight.

In an attempt to overcome the need to provide screened cables, it has been proposed to rectify the output from the sensing capacitor by means of two diodes connected in opposite senses to one electrode of the capacitor and mounted close to the capacitor within the fuel tank or other container. Each diode produces a half-wave rectified signal that is supplied via respective unscreened leads to the detecting circuit. The use of diodes in this way also avoids the need to use screened cables for supplying the energisation signal to the sensor capacitor. There are, however, disadvantages with such an arrangement in that the performance of the diodes and, in particular, the voltage drop across the diodes, varies with change of temperature. Compensation for these temperatures effects can be provided by, for example, deriving separate signals from other diodes mounted in the tank or container and using these separate signals for compensation. Alternatively, the temperature effects can be reduced by supplying a relatively high voltage across the sensing capacitor.

Another problem that arises with capacitive fuel-gauging systems is that the presence of electrically-conductive contaminants, such as water, can significantly affect the output of the sensor and lead to severe errors in the fuel reading. The presence of, for example, one liter of water would normally cause the fuel reading to be erroneously increased by several times this value.

BRIEF SUMMARY OF THE INVENTION

It is an object of the present invention to provide a fluid-gauging system and a method that may be used substantially to overcome the above-mentioned difficulties.

According to one aspect of the present invention, there is provided a fluid-gauging system including a capacitance sensor adapted for immersion within a fluid, supply means arranged to supply an alternating input signal to said sensor such that said sensor provides an alternating output signal that varies in accordance with change in fluid quantity, and detector means that is arranged to receive said output signal, wherein said detector means includes first switching means that is arranged to receive said output signal and that is operated in synchronism and in quadrature with said input signal such that the first switching means passes only a unidirectional current component of said output signal in respect of said fluid quantity, and wherein said detector means includes means that is arranged to receive said unidirectional current component and to provide a d.c. signal the amplitude of which varies in accordance with said fluid quantity.

In such an arrangement, the capacitance sensor can be connected to the detector means by an unscreened lead. Although it may still be necessary to supply the input signal to the sensor by means of a screened lead, the system of the present invention does enable substantial advantages to be achieved. This is especially so where several capacitance sensors are used since the input signal can be supplied to all the sensors by means of a single screened lead whereas only unscreened leads need be used to make the individual connection of each sensor with the detector means.

The said detector means may include a second switching means that is operated in antiphase with said first switching means, said output signal being supplied to both said first and second switching means. The second switching means may be operable to pass a component of said output signal in respect of contaminants in said fluid which may be supplied to indicator means for indicating the presence of said contaminants. In this way, it is possible to provide an indication, for example, of the presence of water in a hydrocarbon fuel, and a measure of its quantity. This can then be taken into account when making a reading of the fuel quantity indicator.

The supply means may include first further switching means that is operated in synchronism and in quadrature with said input signal, and second further switching means that is operated in antiphase with said first switching means. The said supply means may include capacitance means having one electrode connected to receive the said input signal and its other electrode connected to supply a further output signal to said further two switching means. The supply means may include oscillator means arranged to provide said input signal, and control means arranged to maintain the product of the frequency and voltage of said input signal substantially constant.

According to another aspect of the present invention, there is provided a method of obtaining an indication of the quantity of fluid in a container comprising the steps of: supplying an alternating input signal to a capacitance sensor mounted to extend within said container; supplying an alternating output signal from said sensor to integrating means and alternately interrupting and enabling the supply of the output signal to integrating means in synchronism and in quadrature with said input signal.

A fuel gauging system in accordance with the present invention, and for use in an aircraft, will now be described, by way of example, with reference to the accompanying drawings.

DETAILED DESCRIPTION

Figure 1:
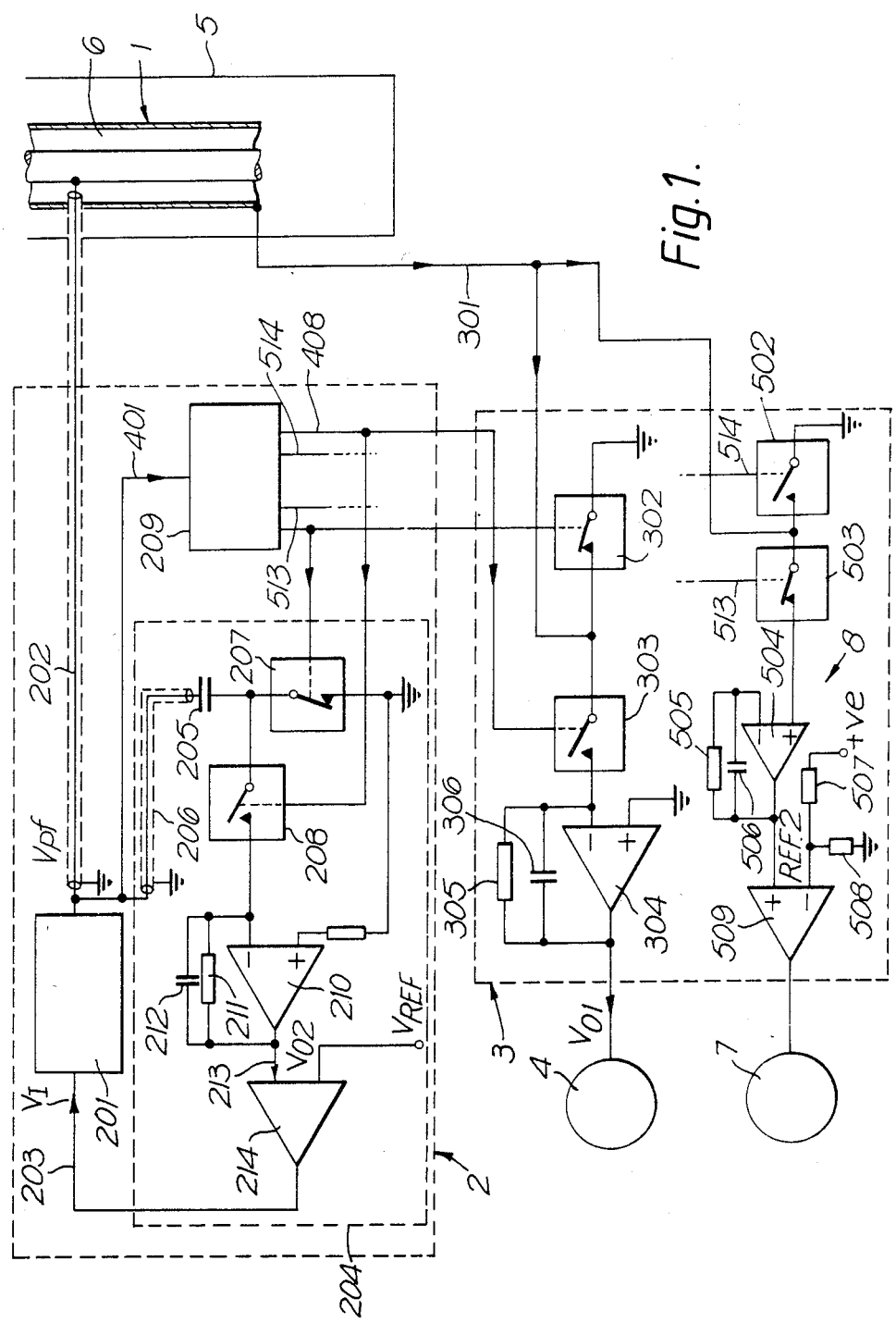
FIG. 1 is a schematic diagram of the system.

With reference to FIG. 1, the fuel-gauging system includes a capacitance sensor unit 1, a supply unit 2 that provides an alternating signal to the sensor unit 1, and a detector unit 3 that provides a d.c. output voltage both to a fuel indicator or fuel-management system 4, and to a contaminant indicator 7, in accordance with changes in the output from the sensor unit 1.

The sensor unit 1 is mounted within an aircraft fuel tank 5 and comprises a capacitor 6 which is positioned at a suitable location for immersion in any fuel present within the tank. The capacitor 6 may be of known form and have, for example, parallel plates or concentric tubes separated from one another by an air-gap which is filled with fuel to a height dependent on the fuel level within the tank 5. As the fuel level changes, the value of the capacitance correspondingly changes, and this change of capacitance is used to provide a measure of the fuel level.

The supply unit 2 includes a sinewave oscillator 201 which produces an alternating output voltage of peak amplitude $V_P$ and frequency f that is supplied via a screened cable 202 to one electrode of the capacitor 6. The output of the oscillator 201 thereby constitutes the drive signal for the sensor unit 1. The oscillator 201 is controlled by the magnitude of a d.c. voltage $V_I$ that is supplied to the input of the oscillator on line 203 such that the voltage-frequency product $V_P f$ of its output is maintained constant.

The voltage on line 203 is derived as the output of a feedback circuit 204. The feedback circuit 204 includes a reference capacitor 205 of capacitance $C_{REF}$ that receives at one electrode the output signals from the oscillator 201 via a screened line 206. The other electrode of the reference capacitor 205 is connected to the inputs of two solid-state switches 207 and 208 which are both controlled by a switching control circuit 209 such that they are closed (that is, turned ON) and opened (that is, turned OFF) in antiphase with one another and synchronously in quadrature with the output signal from the oscillator 201. The output of one switch 207 is connected to earth, the switching control circuit 209 operating to close this switch so that current flows to earth during the positive half of the cycle of the output from the reference capacitor 205. The output of the other switch 208 is connected to the virtual earth input of a current-to-voltage converter amplifier 210, the switching control circuit 209, in this instance, operating to close this switch so that current flows to the input of the converter during the negative half of the cycle of the output from the capacitor 205. The current-to-voltage converter 210 has a feedback resistance 211 and a capacitance 212, so that it acts as an integrator, and has its positive input connected to earth. The integration properties of the converter 210 reduce the effect of any spurious alternating signal that might be passed to the converter via the switch 208. The resultant output of the converter 210 is a d.c. voltage, the amplitude $V_{02}$ of which is given by the following expression:

$$V_{02} = 2V_P f C_{REF} R_{REF} \quad \text{(I)}$$

where $R_{REF}$ is the value of the feedback resistance 211.

The output signal from the converter 210 is supplied via line 213 to one input of a comparator 214, the other input of which is connected to a stable reference voltage $V_{REF}$. The comparator 214 produces the output voltage on line 203 and controls the amplitude $V_I$ of this voltage such that the two comparator inputs are maintained equal, that is, such that:

$$V_{02} = V_{REF} \quad \text{(II)}$$

Thus, for example, if $V_{02}$ were to fall below the value of $V_{REF}$ upon a fall in $V_P$ or f the output $V_I$ of the comparator 214 would be increased. This in turn would raise the peak amplitude $V_P$ of the output of the oscillator 201, which, as can be seen from expression (I), would correspondingly raise the value of $V_{02}$, until it became equal to $V_{REF}$. In this way, by maintaining the product $V_P f$ constant, $V_{02}$ is maintained constant.

The detector unit 3 receives via an unscreened lead 301 the alternating output signal from the other electrode of the capacitor 6 within the sensor unit 1. It will be appreciated that, because of the properties of a capacitor, the output current from the sensor capacitor 6 will lead the drive signal by 90°. The signal on line 301 is supplied to the inputs of two solid-state switches 302 and 303 which are both controlled by the switching control circuit 209 in a similar manner to the switches 207 and 208 in the supply unit 2. The switches 302 and 303, in this respect, are opened and closed in antiphase with one another and synchronously in quadrature with the drive signal on line 202. The output of one switch 302 is connected to earth, the switching control circuit 209 operating to close this switch so that current flows to earth during the positive half of the cycle of the signal on line 301. The output of the other switch 303 is connected to the virtual earth input of a current-to-voltage converter amplifier 304. The switching control circuit 209 causes this switch 303 to close (in the same manner as the switch 208 in the supply unit 2) so that current flows to the converter 304 during the negative half of the cycle of the signal on line 301. The converter 304 has a feedback resistance 305 and a capacitance 306, so that it acts as an integrator, and has its positive input connected to earth. As with the converter 210 in the sensor unit 2, the integration properties of the converter 304 reduce the effect of any spurious alternating signal that might be passed to the converter by the switch 303, thereby giving the system additional immunity to noise. The resultant output from the converter 304 is a d.c. voltage the amplitude $V_{01}$ of which is given by the following expression:

$$V_{01} = 2V_P f C_T R_T \quad \text{(III)}$$

where $R_T$ is the value of the feedback resistance 305, and $C_T$ is the value of the capacitor 6 within the senspor unit 1.

Substituting the expressions (I) and (II) in (III) gives:

$$V_{01} = 2C_T R_T V_{REF}/2C_{REF} R_{REF} \quad (IV)$$

or $$V_{01} = (V_{REF} R_T/C_{REF} R_{REF})C_T \quad (V)$$

Since $V_{REF}$, $C_{REF}$, $R_T$ and $R_{REF}$ are all constants, then:

$$V_{01} \alpha C_T \quad (VI)$$

The magnitude of output voltage $V_{01}$ supplied to the indicator 4 is thereby directly proportional to the capacitance of the sensor capacitor 6 and is therefore directly proportional to the height of fuel in the tank 5.

The contaminant indicating unit 8 operates in an analogous manner except that it is supplied with the in phase component of the signal on line 301. The signal on line 301 is supplied to the inputs of two solid-state switches 502 and 503 which are both controlled by signals from the switching control circuit 209. The switches 502 and 503, in this respect, are opened and closed in antiphase with one another and synchronously with the drive signal on line 202. The output of one switch 502 is connected to earth, the switching control circuit 209 operating to close this switch so that the current on line 301 flows to earth during the negative half of the drive signal on line 202, and to the contaminant indicating unit 8 during the positive half of the drive signal on line 202. Electrically-conductive contaminants, such as water, will give rise to an in-phase signal that is integrated by a current-to-voltage converter amplifier 504 and its feedback resistance 505 and capacitance 506. The output voltage of the amplifier 504 is applied across a d.c. amplifier 509 together with a reference voltage REF 2 established by resistors 507 and 508 which form a potential divider between earth and a source of positive voltage. The reference voltage REF 2 provides a specific lower limit which must be exceeded before an indication is provided by the contaminant indicator 7.

Figure 2:
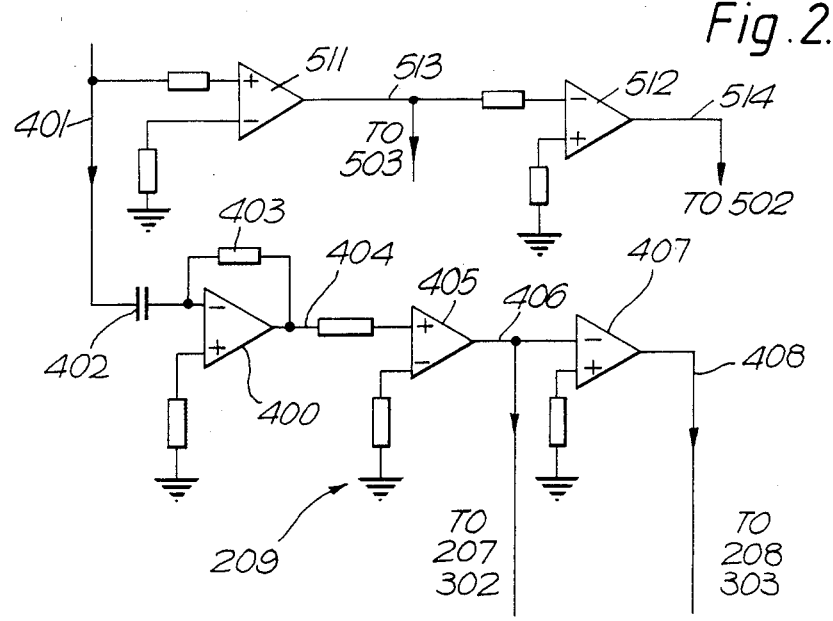
FIG. 2 shows in greater detail a part of the system of FIG. 1.

The switching control circuit 209 will not be described in greater detail with reference to FIG. 2. The circuit 209 includes an operational amplifier 400 which receives at its negative input the sinewave signals from the output of the oscillator 201 on line 401. A capacitance 402 is connected in series in line 401, and a resistance 403 is connected in parallel across the negative input and the output of the amplifier 400 so that the amplifier thereby functions as a differentiator. In this way, the amplifier produces a cosine wave output signal on line 404, that is, an alternating signal that leads the output signal from the oscillator 201 by 90°. The output from this differentiator is fed to the positive input of a comparator 405, the other input of which is connected to earth. The comparator 405 produces a square-wave signal of mark-space ratio 1:1 that is switched between its two states when the signal at its positive input goes through zero.

The output of the comparator 405 is supplied via line 406 to control the switches 207 and 302 and also to the input of an integrated circuit inverter 407. The inverter produces a similar square-wave signal in antiphase with the signal on line 406 and supplies this via line 408 to control the switches 208 and 303.

The switching control unit 209 also includes a further amplifier 511, connected as a comparator, which receives the signal on line 401 at its positive input and produces a square-wave signal of mark-space ratio 1:1 that is switched beween its two states when the signal at its positive input goes through zero.

The output of amplifier 511 is supplied via line 513 to control the switch 503, and also to the negative input of an amplifier 512 connected as an inverter. The amplifier 512 produces a similar square-wave signal in antiphase with the signal on line 513 and supplies this via line 514 to control the switch 502.

Figure 3:
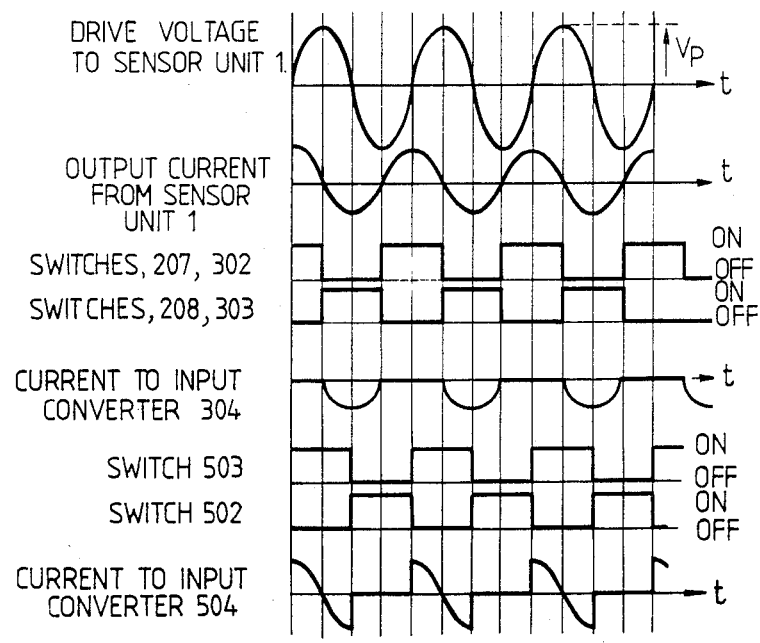
FIG. 3 is a waveform diagram illustrating operation of the system of FIG. 1.

FIG. 3 shows the waveforms at various points in the system and illustrates the operation of the switches 207, 208, 302,303,502 and 503. It will be seen from this that the output current from the sensor unit 1 is 90° out of phase with the driving voltage supplied to the unit—the output current from the reference capacitor 205 is similarly 90° out of phase. The switching control circuit 209, however, as explained above is arranged to control switching of switches 207,208,302 and 303 synchronously in quadrature with the driving voltage and therefore causes switching in phase or antiphase with the output currents from the capacitors 6 and 205.

The switches 502 and 503, however, are switched in phase or antiphase with the drive voltage and are therefore switched in quadrature with the switches 207,208,302 and 303. The current supplied to the input converter therefore takes the form of the bottom trace of FIG. 3 when no conductive contaminants are present.

The switches 207,208,302,303,502 and 503 are solid-state switches of the type RCA CD 4066B, although it will be appreciated that alternative switching means capable of operating at the required frequency could be used.

The switches 207,208,302,303,502 and 503 operate as a phse-sensitive demodulator and synchronous detectors. The arrangement of the switches is effective to reduce noise in the system and especially extraneous signals in phase with the drive voltage. For example, radiated interference in phase with the drive voltage would not be detected. Contaminants in the fuel may also cause extraneous signals if they impair the insulation between the two electrodes of the sensor capacitor 6. These extraneous signals will be in phase with the drive voltage, and the fuel indicator 41 will thereby exhibit a substantial rejection ratio for such signals which are instead displayed by the contaminant indicator 7.

The system of the present invention has the advantage of providing a d.c. output which can be readily processed from analogue to digitial form. The system also has the advantage that there is no need to mount any separate electronic components such as diodes, capacitors, resistors, inductances and so on, other than the sensing capacitor, within the sensor unit in the tank. In this way, errors that might arise from such components due to temperature changes in the vicinity of the sensor unit are avoided. Since no diodes are required, there is no need to use a high drive voltage in order to reduce the temperature effects that might otherwise arise. Providing an indication of the quantity of conductive contaminants is also an important advantage since these contaminants can cause substantial errors in the indication of the quantity of fuel present. If it is known that there is a significant quantity of water present in the fuel tank then this can be taken into account when reading the fuel indicator 4, or compensation made.

It will be appreciated that the system could be modified in various ways. The supply unit, for example, need not be of the kind described above, in which the voltage-frequency product is maintained constant.

What we claim is:

1. A fluid gauging system of the kind including a capacitance sensor adapted for immersion within a fluid, a supply unit that supplies an alternating input signal to said sensor such that said sensor provides an alternating output signal that varies in accordance with change in fluid quantity, and a detector circuit that receives said output signal, the improvement wherein said system includes switching control means that receives a sample of said input signal, and wherein the detector circuit includes a first switching device having first and second inputs and an output, means supplying the output signal of said sensor to the first input of said first switching device, said switching control means being coupled to the second input of said first switching device to cause switching of the said first switching device and thereby connection of the first input with said output in synchronism and in quadrature with said input signal to said sensor, such that the first switching device passes to its output only a unidirectional current component of said output signal representative of said fluid quantity, amplifier means, and means for supplying said unidirectional current component from the output of said first switching device to said amplifier means such that said amplifier means provides a d.c. signal the amplitude of which varies in accordance with said fluid quantity.

2. A system according to claim 1, wherein said detector circuit includes a second switching device having first and second inputs and an output, means supplying said output signal of said sensor to the first input of said second switching device, means coupling said switching control means to the second input of said second switching device to cause switching of the said second switching device and thereby connection of the first input of said second switching device with the output of said second switching device in antiphase with the input signal to said sensor.

3. A system according to claim 2 including indicator means and menas supplying the output of said second switching device to said indicator means.

4. A system according to claim 1, wherein said detector circuit includes a third switching device having first and second inputs and an output, means supplying said output signal of said sensor to the first input of said third switching device, means connecting the output of said third switching device to earth, means coupling said switching control means to second input of said third switching device to cause switching of the said third switching device and thereby connection of the first input of said third switching device to earth in antiphase with switching of said first switching device.

5. A system according to claim 3, wherein said detector circuit includes a fourth switching device having first and second inputs and an output, means supplying said output signal of said sensor to the first input of said fourth switching device, means connecting the output of said fourth switching device to earth, means coupling said switching control means to the second input of said fourth switching device to cause switching of said fourth switching device and thereby connection of the first input of said fourth switching device to earth in antiphase with switching of said second switching device.

6. A system according to claim 1, wherein said supply unit includes an oscillator circuit that provides said input signal to the sensor, and a frequency control circuit that maintains the product of the frequency and voltage of said input signal substantially constant.

7. A system according to claim 6, wherein said supply unit includes a first further switching device having first and second inputs and an output, means supplying a sample of the input signal to the sensor to the first input of said first further switching device, means coupling the switching control means to the second input of said first further switching device to cause switching of the said first further switching device in synchronism and in quadrature with the input signal to the said sensor, and means coupling the output of said first further switching means to said frequency control circuit.

8. A system according to claim 7, wherein said supply unit includes a second further switching device having first and second inputs and an output, means supplying a sample of the input signal to the sensor to the first input of said second further switching device, means coupling the switching control means to the second input of said second further switching device to cause switching of the said second further switching device in antiphase with said first further switching device, and means coupling the output of said second further switching device to earth.

9. A system according to claim 8, wherein said supply unit includes a capacitor, said capacitor being connected to said first input of both said further two switching devices.

10. A system according to claim 1, wherein said supply unit includes means for supplying to said switching control means a signal in response to said input signal to said sensor, said switching means including a differentiating circuit, and wherein said switching control circuit produces a first switching control signal that leads the said input signal to said sensor by 90°.

11. A fluid-gauging system comprising: a capacitance sensor adapted for immersion within a fluid; an oscillator circuit; means for supplying an alternating input signal to said sensor from said oscillator so as to produce an alternating output signal that varies in accordance with fluid quantity; switching control circuit that produces a first switching control signal that leads said alternating output signal by 90°, and a second switching control signal that is in antiphase with said first switching control signal; first and second switching devices; means mounting said first and second switching devices remote from said capacitance sensor; means for supplying said first and second switching control signals to respective switching devices such as thereby to control switching of said devices; means for supplying said alternating output signal to both said first and second switching devices such that said first switching device passes only a unidirectional current component of said output signal representative of said fluid quantity; integrating amplifier means; and means connecting said first switching device to said integrating amplifier means such that said unidirectional current component is supplied to said integrating amplifier means and said integrating amplifier means provides a d.c. signal the amplitude of which varies in accordance with said fluid quantity.

* * * * *